(12) United States Patent
Asahara et al.

(10) Patent No.: US 12,147,756 B2
(45) Date of Patent: Nov. 19, 2024

(54) APPARATUS FOR GENERATING DRAFT DOCUMENT AND METHOD THEREFOR

(71) Applicant: Hitachi, Ltd., Tokyo (JP)

(72) Inventors: Akinori Asahara, Tokyo (JP); Hidekazu Morita, Tokyo (JP); Takuya Kanazawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/032,283

(22) PCT Filed: Oct. 14, 2021

(86) PCT No.: PCT/JP2021/038027
§ 371 (c)(1),
(2) Date: Apr. 17, 2023

(87) PCT Pub. No.: WO2022/085554
PCT Pub. Date: Apr. 28, 2022

(65) Prior Publication Data
US 2023/0394227 A1    Dec. 7, 2023

(30) Foreign Application Priority Data
Oct. 20, 2020 (JP) .................................. 2020-175911

(51) Int. Cl.
*G06F 40/166* (2020.01)
*G06F 40/174* (2020.01)
(52) U.S. Cl.
CPC .......... *G06F 40/166* (2020.01); *G06F 40/174* (2020.01)
(58) Field of Classification Search
None
See application file for complete search history.

(56) References Cited

U.S. PATENT DOCUMENTS

| 6,182,095 B1 * | 1/2001 | Leymaster ............ G06F 40/174 715/236 |
| 2002/0046235 A1 * | 4/2002 | Foy ....................... G06F 40/166 715/255 |

(Continued)

FOREIGN PATENT DOCUMENTS

| AU | 2006263703 A1 * | 2/2008 | ............. G06F 16/29 |
| JP | 2001-134559 A | 5/2001 | |

(Continued)

OTHER PUBLICATIONS

Sprowl, James, et al. "An expert system for drafting legal documents." Proceedings of the Jul. 9-12, 1984, national computer conference and exposition. 1984. (Year: 1984).*

(Continued)

*Primary Examiner* — Amelia L Tapp
(74) *Attorney, Agent, or Firm* — MATTINGLY & MALUR, PC

(57) ABSTRACT

The draft document generating method repeats question processing for component elements selected from the case database to the user. The question processing presents, by an output device, one or more of the component elements selected from the case database to the user, presents a question as to whether the component elements are applicable to contents of a draft document to the user, acquires, via an input device, an answer of the user to the question; and adds the answer in an answer history. The selecting of the one or more component elements for which the question processing is to be executed next from unprocessed component elements in the plurality of cases is based on statistics of part of the component elements in the plurality of cases. The draft document is generated based on a component element indicating that the answer history is applicable to contents of the draft document.

11 Claims, 19 Drawing Sheets

(56) References Cited

U.S. PATENT DOCUMENTS

| | | | |
|---|---|---|---|
| 2006/0287966 A1 | 12/2006 | Srinivasaraghavan et al. | |
| 2007/0292833 A1* | 12/2007 | Brodie ................ | H04M 3/5191 |
| | | | 434/350 |
| 2016/0321939 A1* | 11/2016 | Anantha ................ | G09B 19/06 |
| 2018/0329874 A1 | 11/2018 | Peden | |

FOREIGN PATENT DOCUMENTS

| | | |
|---|---|---|
| JP | 2004-213156 A | 7/2004 |
| JP | 2012-141832 A | 7/2012 |
| JP | 2020-035165 A | 3/2020 |
| JP | 2020-140369 A | 9/2020 |

OTHER PUBLICATIONS

International Search Report of PCT/JP2021/038027 dated Dec. 21, 2021.
Extended European Search Report received in corresponding European Application No. 21882695.6 dated Aug. 30, 2024.

* cited by examiner

LOGIN INFORMATION 309

| ITEM NAME | CONTENTS |
|---|---|
| USER ID 501 | ID TO IDENTIFY USER |
| PASSWORD 502 | PASSWORD FOR USER |

USER DATA TABLE IN USER INFORMATION DB 600

| ITEM NAME | CONTENTS |
|---|---|
| USER ID 601 | IDENTIFIER CORRESPONDING TO USER ID 501 |
| USER NAME 602 | CHARACTER STRING INDICATING USER NAME |
| PASSWORD 603 | PASSWORD FOR USER AUTHENTICATION |

| ITEM NAME | CONTENTS |
|---|---|
| USER ID 801 | IDENTIFIER CORRESPONDING TO USER ID 601 |
| CASE ID 802 | IDENTIFIER IDENTIFYING CASE |
| CASE EXPRESSION 803 | EXPRESS DETAILS OF PRESENT CASE. CHARACTER STRING SMILES FORMAT CAPABLE OF EXPRESSING CHEMICAL FORMULA USED FOR EXAMINATION IN THIS EXAMPLE |

USER CASE TABLE IN USER CASE DB — 800

CASE SELECTION RECORD TABLE IN ANSWER HISTORY DB — 900

| ITEM NAME | CONTENTS |
|---|---|
| USER ID 901 | IDENTIFIER CORRESPONDING TO USER ID 601 |
| CASE ID 902 | IDENTIFIER CORRESPONDING TO CASE ID 802 |
| ANSWER 903 | CODE INDICATING YES IS RECORDED |
| PROJECT ID 904 | IDENTIFIER SEQUENTIALLY NUMBERED FOR CASE SELECTION |

FIG. 11

CASE TABLE IN COMMON CASE DB — 1100

| ITEM NAME | CONTENTS |
|---|---|
| CASE ID 1101 | IDENTIFIER IDENTIFYING CASE |
| CASE EXPRESSION 1102 | EXPRESS DETAILS OF PRESENT CASE. CHARACTER STRING SMILES FORMAT CAPABLE OF EXPRESSING CHEMICAL FORMULA USED FOR EXAMINATION IN THIS EXAMPLE |

FIG. 12

APPLICABILITY INFORMATION — 313

| ITEM NAME | CONTENTS |
|---|---|
| CASE ID 1201 | IDENTIFIER CORRESPONDING TO CASE ID 1101 |
| APPLICABILITY FLAG 1202 | CODE INDICATING YES OR NO |
| USER ID 1203 | VALUE OF USER ID 601 IS RECORDED |
| PROJECT ID 1204 | VALUE OF PROJECT ID 904 IS RECORDED |

FIG. 16

USER CASE DB 113

USER CASE COMPONENT ELEMENT TABLE 1600

| ITEM NAME | CONTENTS |
|---|---|
| USER ID 1601 | IDENTIFIER CORRESPONDING TO USER ID 601 |
| CASE ID 1602 | IDENTIFIER CORRESPONDING TO CASE ID 802 |
| COMPONENT ELEMENT ID 1603 | IDENTIFIER CORRESPONDING TO COMPONENT ELEMENT ID 1611 |
| PRESENCE/ABSENCE FLAG 1604 | PRESENCE: 1, ABSENCE: 0 |

COMPONENT ELEMENT MASTER DATA 1610

| ITEM NAME | CONTENTS |
|---|---|
| COMPONENT ELEMENT ID 1611 | IDENTIFIER IDENTIFYING COMPONENT ELEMENT |
| COMPONENT ELEMENT EXPRESSION 1612 | IMAGE EXPRESSING COMPONENT ELEMENT |

FIG. 17

COMPONENT ELEMENT TABLE IN COMMON CASE DB 1700

| ITEM NAME | CONTENTS |
|---|---|
| CASE ID 1701 | IDENTIFIER CORRESPONDING TO CASE ID 1101 |
| COMPONENT ELEMENT ID 1702 | IDENTIFIER CORRESPONDING TO COMPONENT ELEMENT ID 1611 |
| PRESENCE/ABSENCE FLAG 1703 | PRESENCE: 1, ABSENCE: 0 |

FIG. 22

USER DATA TABLE IN USER INFORMATION DB 2201

| ITEM NAME | CONTENTS |
|---|---|
| USER ID 601 | IDENTIFIER CORRESPONDING TO USER ID 501 |
| USER NAME 602 | CHARACTER STRING INDICATING USER NAME |
| PASSWORD 603 | PASSWORD FOR USER AUTHENTICATION |
| USER ATTRIBUTE 2102 | ATTRIBUTE VALUE OF USER |

FIG. 23

EXTERNAL INFORMATION MANAGEMENT TABLE IN ANSWER HISTORY DB 2301

| ITEM NAME | CONTENTS |
|---|---|
| USER ID 2302 | IDENTIFIER CORRESPONDING TO USER ID 601 |
| PROJECT ID 2303 | IDENTIFIER CORRESPONDING TO PROJECT ID 904 |
| EXTERNAL INFORMATION TYPE 2304 | CODE CAPABLE OF IDENTIFY USER ATTRIBUTE TYPE OR EXTERNAL SYSTEM |
| EXTERNAL INFORMATION CONTENT 2305 | VALUE FOR EXTERNAL INFORMATION |

APPARATUS FOR GENERATING DRAFT DOCUMENT AND METHOD THEREFOR

INCORPORATION BY REFERENCE

The present application claims priority to Japanese Patent Application No. 2020-175911 filed on Oct. 20, 2020, the contents of which are incorporated herein by reference.

TECHNICAL FIELD

The present invention relates to a technology for supporting user's document writing.

BACKGROUND ART

In various research-and-development and investigations, it is possible to obtain facts and empirical rules confirmed by practicians. Such implicit knowledge is extremely valuable information for an employer who employs the practicians, and it is desirable to share the implicit knowledge with many employees without being limited to the practicians.

For this purpose, measures are often taken to create and share documents such as reports. However, in writing a document, the quality of information transmission varies depending on the writing skill of the writer. That is, it is not easy to acquire the writing skill to convey information to the readers without excess or deficiency, which causes omission of transmission or misunderstanding.

For the purpose of supporting it, a system which supports the writing by automatically checking the grammar or the like of the created document has been used. However, in practice, it is often more difficult to determine what should be described as a document than to write the document itself. In particular, in describing a matter including a plurality of component elements, it takes much time and effort to describe the detailed description for all the component elements, and it is also difficult to read the detailed description. It is therefore common to document only important component elements; however, sufficient skill is required for the writer to determine which component elements are important.

As a specific example, there is selection of elements to be described in the claims in a patent application. When determining the elements to be described in the claims, it is necessary to select elements which express the features of the invention without excess or deficiency.

Alternatively, for example, there is a case where a report for a trend regarding a group of booths visited when a user visits an exhibition or the like. At this time, it is necessary to select what should be written in the report among the cases which have been observed and heard. If too general matters are described, the report becomes redundant and long. However, if the description is too small, the matters to be reported may be overlooked.

Alternatively, there is an investigation for selecting an outsourcing contractor of system development. At this time, it is desirable to examine and compare the characteristics of each contractor and select a contractor based on a reasonable standard; however, even if information can be collected, it takes time and effort to organize the characteristics of each contractor. If the features common to all the contractors are listed, the comparison becomes difficult. However, if the number of items indicated as features is too small, the validity of the comparison is impaired.

In this way, when creating a document, it is highly necessary to select matters to be described in the document without excess or deficiency. However, there is a problem that it cannot be supported by a generally used method of checking grammars or the like.

As a known method for supporting in determining an outline of a document to be described, PTL 1 discloses a method for recommending a format to be used based on questions and answers. According to this method, a user can specify the template of a document only by answering a question presented by the system. In addition, PTL 2 discloses a technique of easily managing answer data to a question by searching for a question sentence with a conceptual keyword. According to this method, a template can be conceptually searched.

CITATION LIST

Patent Literatures

PTL 1: JP 2020-35165 A
PTL 2: JP 2004-213156 A

SUMMARY OF INVENTION

Technical Problem

However, in the conventional method described above, an effect of selecting a component element to be particularly emphasized among the plurality of component elements described above cannot be expected. The present invention has been made in view of such a situation, and when a user memorizes information of a case having a plurality of component elements, it becomes easy to consider what is described and what is omitted in the process of drafting a document with the information.

Solution to Problem

One aspect of the present invention is an apparatus for generating a draft document for a user, and the apparatus includes one or more processors and one or more storage devices. The one or more storage devices store a case database which stores a plurality of cases each including one or more component elements. The one or more processors repeat question processing for one or more component elements selected from the case database to the user. The question processing includes presenting, by an output device, one or more component elements selected from the case database, presenting, by the output device, a question as to whether the one or more component elements applicable to contents of a draft document to the user, acquiring, via an input device, an answer of the user to the question; and adding the answer in an answer history stored in the one or more storage devices. The one or more processors select one or more component elements for which the question processing is to be executed next from among one or more component elements for which the question processing is unprocessed in the plurality of cases based on statistics of at least a part of the component elements in the plurality of cases, and generates the draft document based on a component element indicating that the answer history is applicable to contents of the draft document of the user.

Advantageous Effects of Invention

According to the invention of the present application, it is easy to reflect information to be emphasized among the

BRIEF DESCRIPTION OF DRAWINGS

FIG. 11 illustrates an example of a case table according to the first embodiment.

FIG. 12 illustrates an example of applicability information according to the first embodiment.

FIG. 16 illustrates an example of a data structure of a user case component element of the first embodiment.

FIG. 17 illustrates an example of a component element table according to the first embodiment.

FIG. 22 illustrates an example of a user data table according to the second embodiment.

FIG. 23 illustrates an example of an external information management table according to the second embodiment.

DESCRIPTION OF EMBODIMENTS

In the following description, when it is necessary for convenience, the description will be divided into a plurality of sections or embodiments; however unless otherwise specified, the sections or embodiments are not unrelated to each other, and one is in a relationship of some or all modifications, details, supplementary explanation, and the like of the other. Furthermore, in the following description, when referring to the number of elements and the like (including number, numerical value, amount, range, and the like), the number of elements is not limited to a specific number unless otherwise specified or unless clearly limited to the specific number in principle, and the number of elements may be greater than or equal to or less than the specific number.

A document creation support apparatus described below estimates a component element applicable to a draft document by asking a question to a user, and generates a draft document based on a result of the estimation. A sentence represents one collective content and is a list of symbols including words. A sentence may be composed of only words, for example, and may include symbols different from words, such as mathematical formulas and chemical formulas. A composition includes one or more sentences. A document is an object in which information to be conveyed to a person is described by some form such as a character or an image, and can be composed of composition, for example, and can include an image.

In writing documents, it is often difficult to determine what should be described in a document. It is common to document only important component elements; however, sufficient skill is required for the writer to determine which component elements are important.

As an example, there is a selection of elements to be described in the claims in a patent application. When determining the elements to be described in the claims, it is necessary to select elements which express the features of the invention without excess or deficiency. As another example, there is a case where a report for a trend regarding a group of booths visited when a user visits an exhibition or the like. At this time, it is necessary to select what should be written in the report among the cases which have been observed and heard. As another example, there is an investigation for selecting an outsourcing contractor of system development.

When creating a document, it is highly necessary to select matters to be described in the document without excess or deficiency. According to an embodiment of the present specification, it becomes easy to reflect information to be emphasized among the information only memorized by the user in the document without excess or deficiency and without taking much time and effort. As a result, it is possible to leave, as a document, knowledge that exists only in the memory of the practicians of the intellectual labor and is likely to be dissipated, and to reuse the knowledge.

First Embodiment

Figure 1:
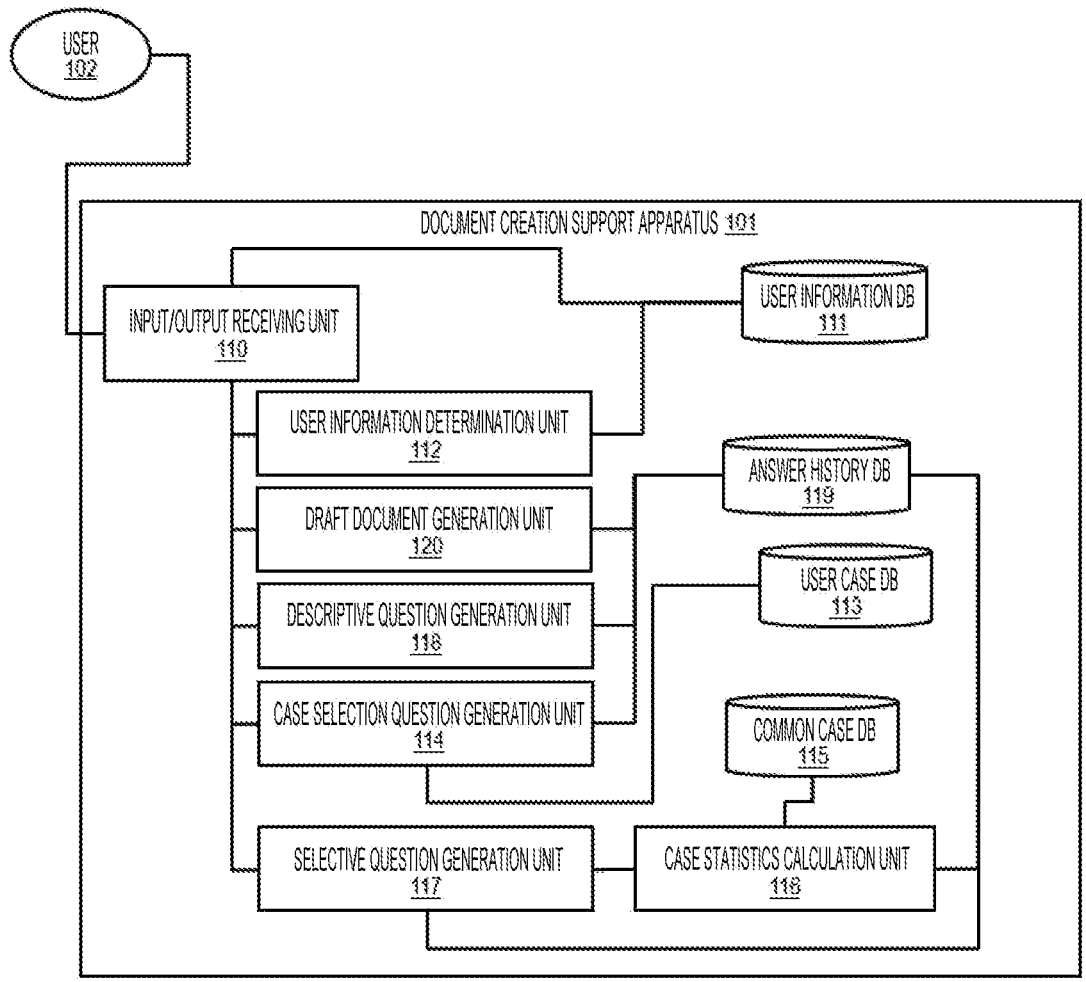
FIG. 1 illustrates a configuration example according to the first embodiment.

As an embodiment of the document creation support apparatus, a logical configuration example of an apparatus which supports claim drafting of a patent related to a chemical formula is illustrated in FIG. 1. The user can easily make the claims for a chemical formula. The claims are represented as one sentence and may constitute a document. The document creation support apparatus 101 of the present embodiment includes an input/output receiving unit 110, a user information determination unit 112, a case selection question generation unit 114, a case statistics calculation unit 116, a selective question generation unit 117, a descriptive question generation unit 118, and a draft document generation unit 120. The document creation support apparatus 101 further includes a user information database (DB) 111, a user case DB 113, a common case DB 115, and an answer history DB 119.

The input/output receiving unit 110 receives an input from the user 102. The user information DB 111 stores user information. The user information determination unit 112 authenticates a user and specifies the user.

The user case DB 113 stores candidate cases which can be a target of documentation for each user. The case selection question generation unit 114 allows the user to select one from the cases stored in the user case DB 113 when using the present apparatus. The common case DB 115 stores information on common cases to all users.

The case statistics calculation unit 116 calculates statistical information based on the information of the common case DB 115. The selective question generation unit 117 generates a selective question based on the result of the case statistics calculation unit 116. The descriptive question generation unit 118 generates a descriptive question for information to be confirmed by the descriptive question by a user 102. The answer history DB 119 stores answers of the user 102 to the selective question and the descriptive question. The draft document generation unit 120 generates a draft document based on the answer history.

Figure 2:
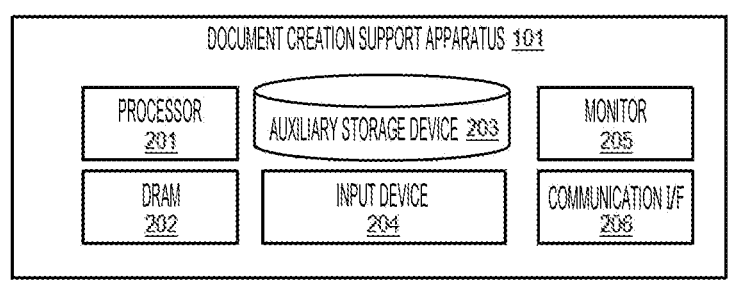
FIG. 2 illustrates a hardware implementation example according to the first embodiment.

FIG. 2 illustrates an example of a configuration of physical implementation of the document creation support apparatus 101. The document creation support apparatus 101 can be implemented using, for example, a general computer. The document creation support apparatus 101 can be implemented using, for example, a general computer.

That is, the document creation support apparatus 101 includes a processor 211 having configuration and computation performance, and a DRAM 212 which is a main storage device providing a volatile temporary storage area for storing a program and data executed by the processor 211. That is, the document creation support apparatus 101 can further include an auxiliary storage device 213 which provides a permanent information storage area using a hard disk drive (HDD), a flash memory, or the like, and an interface 216 such as a serial port or the like for performing data communication with another device. Furthermore, the document creation support apparatus 101 includes an input device 214 such as a mouse and a keyboard for performing an operation, and a monitor 215 (an example of an output device) which presents an output result in each process to the user.

The program executed by the processor 211 and the processing target data are loaded from the auxiliary storage device 213 to the DRAM 212. The plurality of functions of the document creation support apparatus 101 may be distributed to a plurality of computers. As described above, the document creation support apparatus 101 includes one or more storage devices and one or more processors.

The input/output receiving unit 110, the user information determination unit 112, the case selection question generation unit 114, the case statistics calculation unit 116, the selective question generation unit 117, the descriptive question generation unit 118, and the draft document generation unit 120 can be implemented by the processor 201 executing a program recorded in the auxiliary storage device 213. The user information DB 111, the user case DB 113, the common case DB 115, and the answer history DB 119 can be implemented by the processor 201 executing a program for accumulating data in the auxiliary storage device 213.

The document creation support apparatus 101 may be a physical computer system (one or more physical computers) as described above, or may be constructed on a calculation resource group (a plurality of calculation resources) such as a cloud platform. The computer system or the calculation resource group includes one or more interface devices (for example, including a communication interface device and an input/output device), one or more storage devices (for example, including a memory (main storage) and an auxiliary storage device), and one or more processors.

In a case where the function is realized by executing the program by the processor, the determined processing is appropriately executed using the storage device and/or the interface device, and thus, the function may be at least a part of the processor. The processing described with the function as the subject may be processing performed by a processor or a system including the processor. The program may be installed from a program source. The program source may be, for example, a program distribution computer or a computer-readable storage medium (for example, a computer-readable non-transitory storage medium). The description of each function is an example, and a plurality of functions may be integrated into one function or one function may be divided into a plurality of functions.

Figure 3:
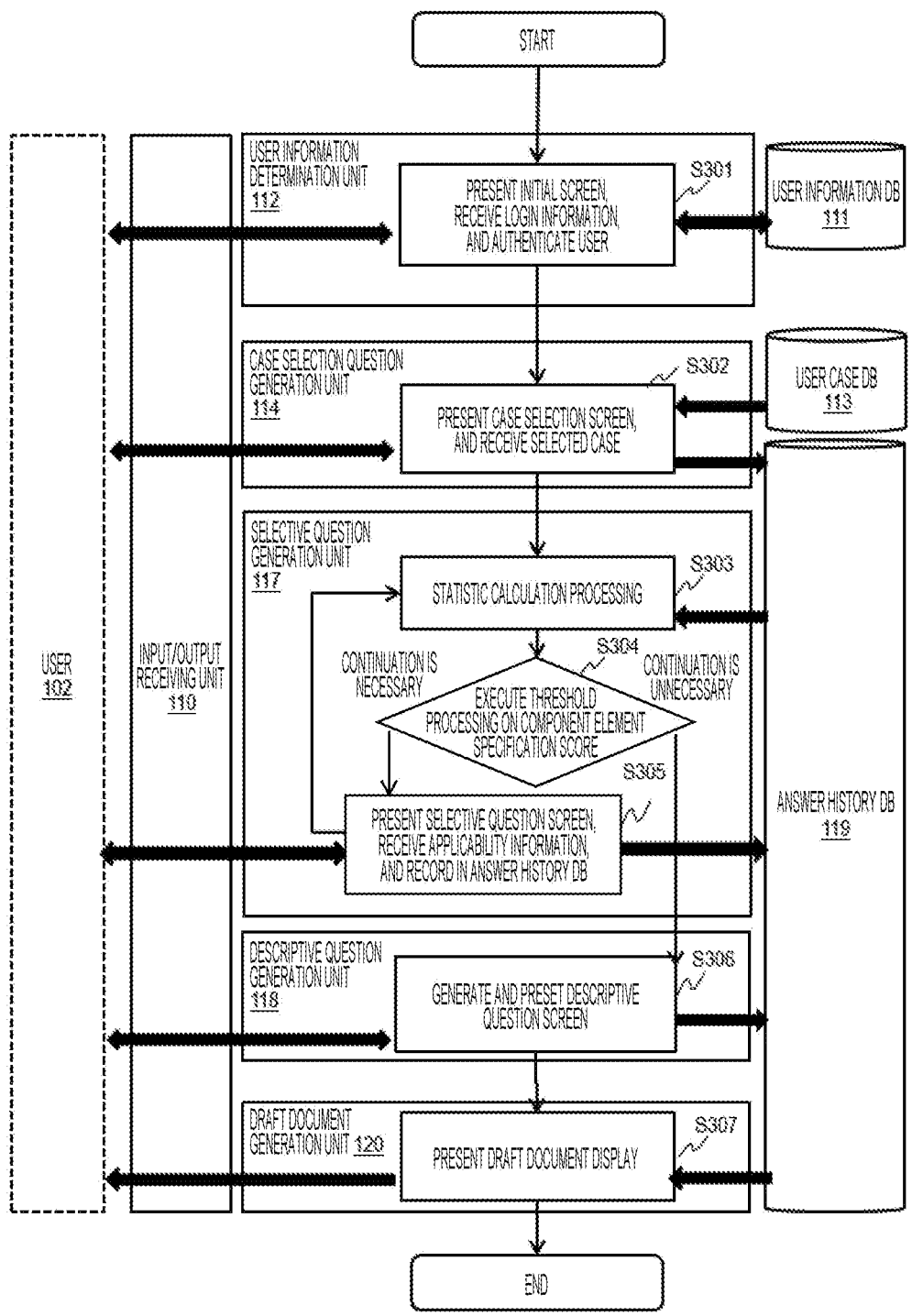
FIG. 3 illustrates an example of a processing flow according to the first embodiment.
Figures 4, 5, 6:
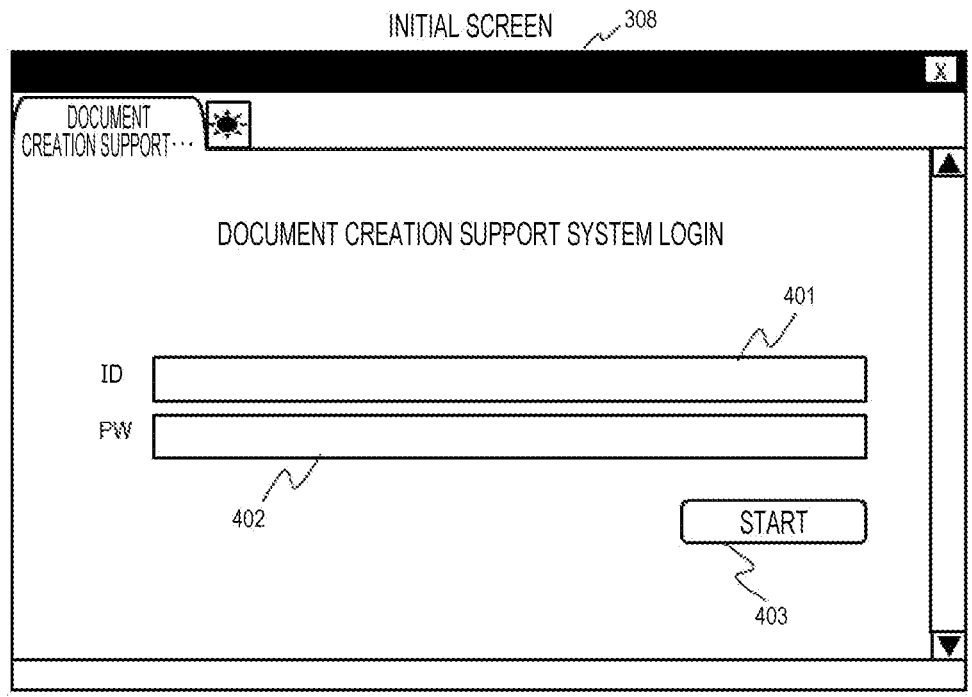
FIG. 4 illustrates an example of an initial screen according to the first embodiment.
FIG. 5 illustrates an example of login information according to the first embodiment.
FIG. 6 illustrates an example of a user data table according to the first embodiment.

FIG. 3 illustrates an operation procedure of the document creation support apparatus 101 according to the first embodiment. When the document creation support apparatus 101 is activated, the user information determination unit 112 generates an initial screen and presents the initial screen through the input/output receiving unit 110, and waits for access of the user 102. FIG. 4 illustrates an example 308 of this initial screen displayed on the monitor 205.

A text box 401 for which an ID of the user 102 is input, and a text box 402 for which a password is input are displayed on the initial screen 308. When the user 102 inputs them by the input device 204 and presses the use start button 403, the user information determination unit 112 generates login information 309 illustrated in FIG. 5 based on the input information. FIG. 5 is a diagram illustrating a configuration example of the login information 309. The items of the login information 309 include a user ID 501 and a password 502.

In this example, the content of the text box 401 is stored in the user ID 501, and the content of the text box 402 is stored in the password 502. Thereafter, the login information 309 is sent to the user information determination unit 112. The user information determination unit 112 collates the input information with the user data table of the user information DB 111 to authenticate the user 102 (S301).

FIG. 6 illustrates an example of the user data table 600. FIG. 6 is a diagram illustrating a configuration example of the user data table 600. The items of the user data table 600 include a user ID 601, a user name 602, and a password 603.

In this example, authentication is performed by comparing the value of the user ID 501 of the login information 309 with the value of the user ID 601 of the user data table 600, and further comparing the value of the password 502 of the login information 309 with the value of the password 603 of the user data table 600. Here, a typical method using an ID and a password is used as a method used for authentication of the user 102; however, any method may be used as long as the user 102 can be appropriately specified.

Next, the case selection question generation unit 114 acquires a case related to the current user 102 from the user case DB 113. The case selection question generation unit 114 displays a case selection screen 310 through the input/output receiving unit 110 in order to allow the user 102 to select one case from among them (S302).

Figures 7, 8:
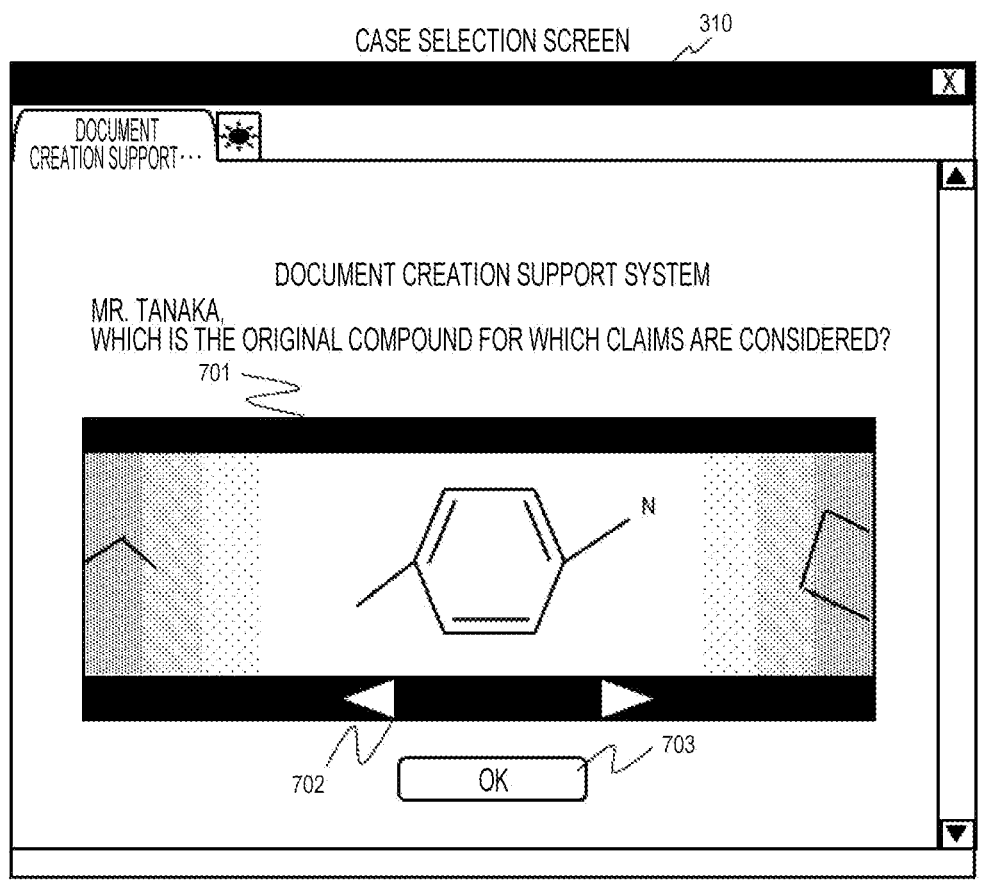
FIG. 7 illustrates an example of a case selection screen according to the first embodiment.
FIG. 8 illustrates an example of a user case table according to the first embodiment.

FIG. 7 illustrates an example of the case selection screen 310. In this example, an image (chemical structural formula) 701 obtained based on the information of the user case DB 113 is displayed. For example, the user 102 can select a case by clicking a control 702 within the case selection screen 310 and determine the selected case by pressing a button 703.

FIG. 8 illustrates an example of a user case table 800 in the user case DB 113 used to generate the case selection screen 310. FIG. 8 is a diagram illustrating a configuration example of the user case table 800. The user case table 800 stores a user-specific case of each user. The common case is referred to for all users, and the user case is referred to only for that user.

The items of the user case table 800 include a user ID 801, a case ID 802, and a case representation 803. The case representation 803 stores representations of case content. The user ID 801 corresponds to the user ID 601 of the user data table 600. The case selection question generation unit 114 can select only a record corresponding to the current user 102 by referring to the user ID 801.

The case selection question generation unit 114 can display the image 701 of the case selection screen 310 by acquiring the SMILES character string representation of a chemical formula stored as the case representation 803 from among them, and drawing it. The case representation 803 of the present example is a SMILES character string representation; however, an appropriate type of the case representation 803 may be selected according to the type of a sentence to be generated. This is similar for the common case database.

Any representation may be used as long as it indicates the case, and for example, the image information may be stored as it is. In addition, the user name 602 may be displayed so that the user can confirm whether or not the incorrect login information is used. A plurality of user cases may be selectable, and selection of a user case may be omitted. Selection of a user case facilitates selection of a common case for identifying a scope of the claims.

Figures 9, 10:
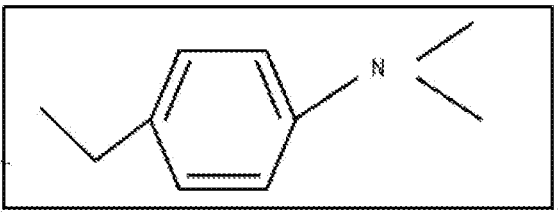
FIG. 9 illustrates an example of a case selection record table according to the first embodiment.
FIG. 10 illustrates an example of a selective question screen according to the first embodiment.

When the user selects one case via the case selection screen 310, the value of the case ID 802 corresponding thereto is transmitted from the input/output receiving unit 110 to the case selection question generation unit 114. The case selection question generation unit 114 receives the same and stores the same in a case selection record table 900 stored in the answer history DB 119 illustrated in FIG. 9. FIG. 9 is a diagram illustrating a configuration example of the case selection record table 900.

The items of the case selection record table 900 include a case ID 902, an answer 903, and a project ID 904. The value of the user ID 601 is stored in the user ID 901. The value of the case selected in the case ID 802 is stored in the case ID 902. The answer 903 always stores a code meaning YES in this example. In another example, case ID 902 may store all user cases including non-selected cases, and answer 903 may store a code indicating the selected case and a code explicitly indicating that the case is not subject to claim drafting. The project ID 904 stores an identifier (project ID) assigned to a series of processing executed starting from case selection.

Next, the selective question generation unit 117 repeats the question processing (S303 to S305). The selective question generation unit 117 selects a common case for which the question processing is to be executed next from among unprocessed common cases based on statistics of at least a part of the component elements of the common case DB 115.

Specifically, the selective question generation unit 117 executes statistic calculation processing (S303). In this statistic calculation processing, the statistic of the component elements recorded in the answer history DB 119 is calculated. In the statistic calculation processing, a component element specification score and a case importance score are calculated based on information recorded in the answer history DB 119. The component element specification score indicates how much the scope of the claims can be specified from the answer history so far. The case importance score indicates how meaningful a question is made to each case stored in the common case DB 115. The details of this processing will be described later.

Thereafter, the selective question generation unit 117 executes threshold processing on the component element specification score (S304). That is, the selective question generation unit 117 determines whether or not a subsequent question is necessary (whether or not to stop the question processing) by evaluating whether or not the score is smaller than a predetermined threshold. If continuation is necessary (S304: continuation is necessary), the selective question generation unit 117 displays a selective question screen for a case having the highest case importance score among the unprocessed (unquestioned) cases in the common case DB 115, and inquires whether or not the case applicable to the target scope (content) of the claims (invention) currently being considered by the user 102 at this time (S305). A case is composed of one or more component elements, and this question is to inquire whether one or more component elements constituting the case, as a combination of component elements, applicable to the content of the claims that is a draft document.

FIG. 10 illustrates an example of the selective question screen 312. In an area 1001 at the center of the screen, the chemical formula of the case with the highest case importance score is drawn. FIG. 11 is a diagram illustrating a configuration example of the case table 1100 of the common case DB 115 necessary for this drawing. The items of the case table 1100 include a case ID 1101 and a case representation 1102. The case ID 1101 stores an identifier (ID) of the common case. The case representation 1102 stores a SMILES string corresponding to the representation of the case identified by case ID 1101. The information of the case representation 1102 is a target to be drawn in the drawing area 1001.

The user answers whether or not the presented case is included in the currently assumed target scope, that is, whether or not to include all assumed component elements. The input/output receiving unit 110 returns the applicability information 313 indicating the answer result of the user 102 to the selective question generation unit 117. FIG. 12 is a diagram illustrating a configuration example of the applicability information 313. The items of the applicability information 313 include a case ID 1201, an applicability flag 1202, a user ID 1203, and a project ID 1204.

The case ID 1201 stores a value of the case ID 1101 of the case table 1100. The applicability flag 1202 indicates information of YES/NO. YES indicates that the case is an applicable case included in the currently assumed target scope, and NO indicates that the case is a non-applicable case not included in the target scope.

The user ID 1203 stores a value of the user ID 501 of the login information 309 for specifying the current user 102. The project ID 1204 stores a value of the project ID 904 in the case selection record table 900. The applicability information 313 is returned from the input/output receiving unit 110 to the selective question generation unit 117, and is stored in the answer history table of the answer history DB 119. In this table, the applicability information 313 is stored as it is.

When the question and answer S305 using the selective question screen 312 ends, the statistic calculation processing S303 is executed again, and then the threshold processing S304 for the component element specification score is executed. This process is repeated until it is determined that continuation is not necessary in the threshold processing S304 for the component element specification score.

Figure 13:
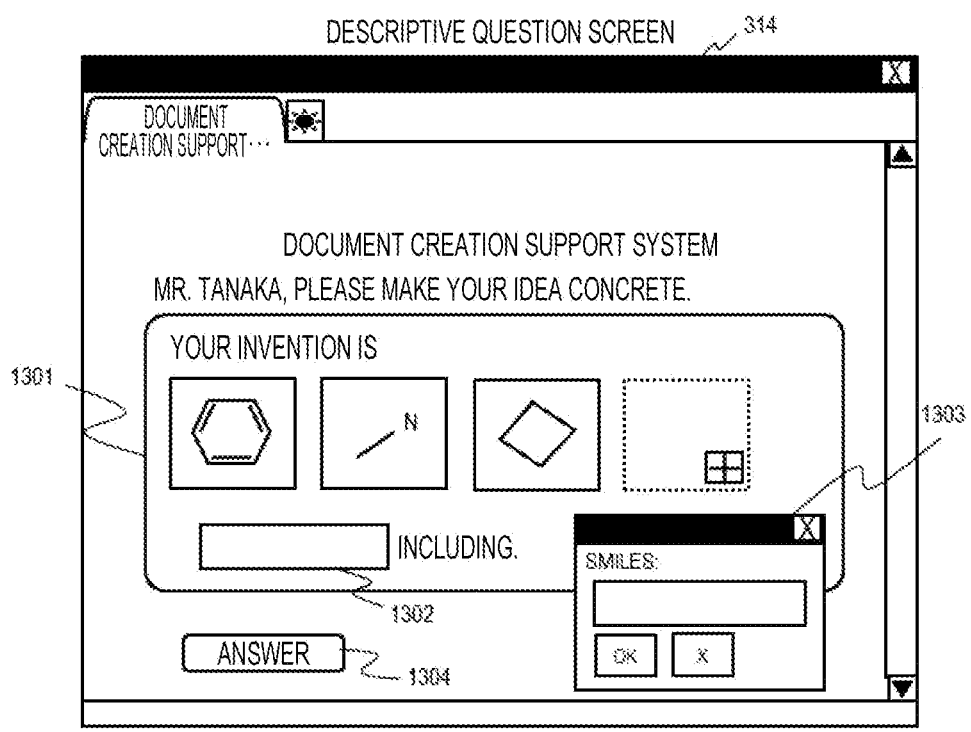
FIG. 13 illustrates an example of a descriptive question screen according to the first embodiment.

If it is determined in the threshold processing S304 for the component element specification score that continuation is not necessary, the descriptive question generation unit 118 presents the descriptive question screen 314 via the input/output receiving unit 110 and obtains an answer to the descriptive question (S306). FIG. 13 illustrates an example of the descriptive question screen 314 displayed on the monitor 205. In an area 1301 at the center of the screen, an image of the specified component element is displayed. A field 1302 allows description for an image of the area 1301.

Note that the generation procedure of the image of the component element in the area 1301 is related to the statistic calculation processing S303 and will be described later. In addition, a section 1303 allows addition of a component element by the user 102. For example, a representation of a component element that is not included in the target scope assumed by the user 102 at the time of selecting the applicability, or a representation of a component element that is not included in the common case DB 115 may be input. When the user 102 presses the answer button 1304 after inputting these information, the input information is transferred from the input/output receiving unit 110 to the draft document generation unit 120, and a final draft document display is generated. Note that the user 102 may be able to delete some of the presented component elements on the descriptive question screen 314.

Figure 14:
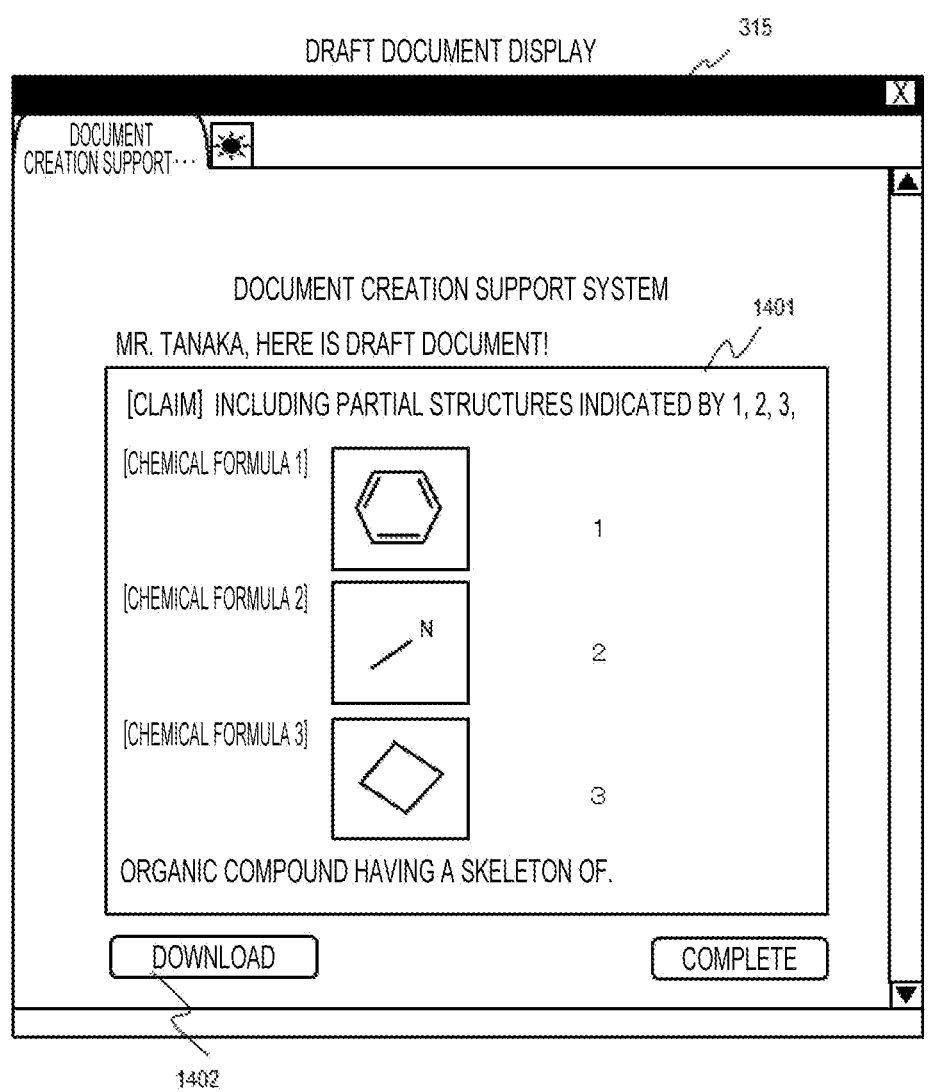
FIG. 14 illustrates an example of draft document display according to the first embodiment.

FIG. 14 illustrates an example of the draft document display 315 according to the first embodiment. A draft document 1401 based on the component elements is displayed in the center of the screen. A button 1402 allowing download of a document file of the draft document may be provided. The generation of the draft document is related to the statistic calculation processing S303 and will be described later.

Figure 15:
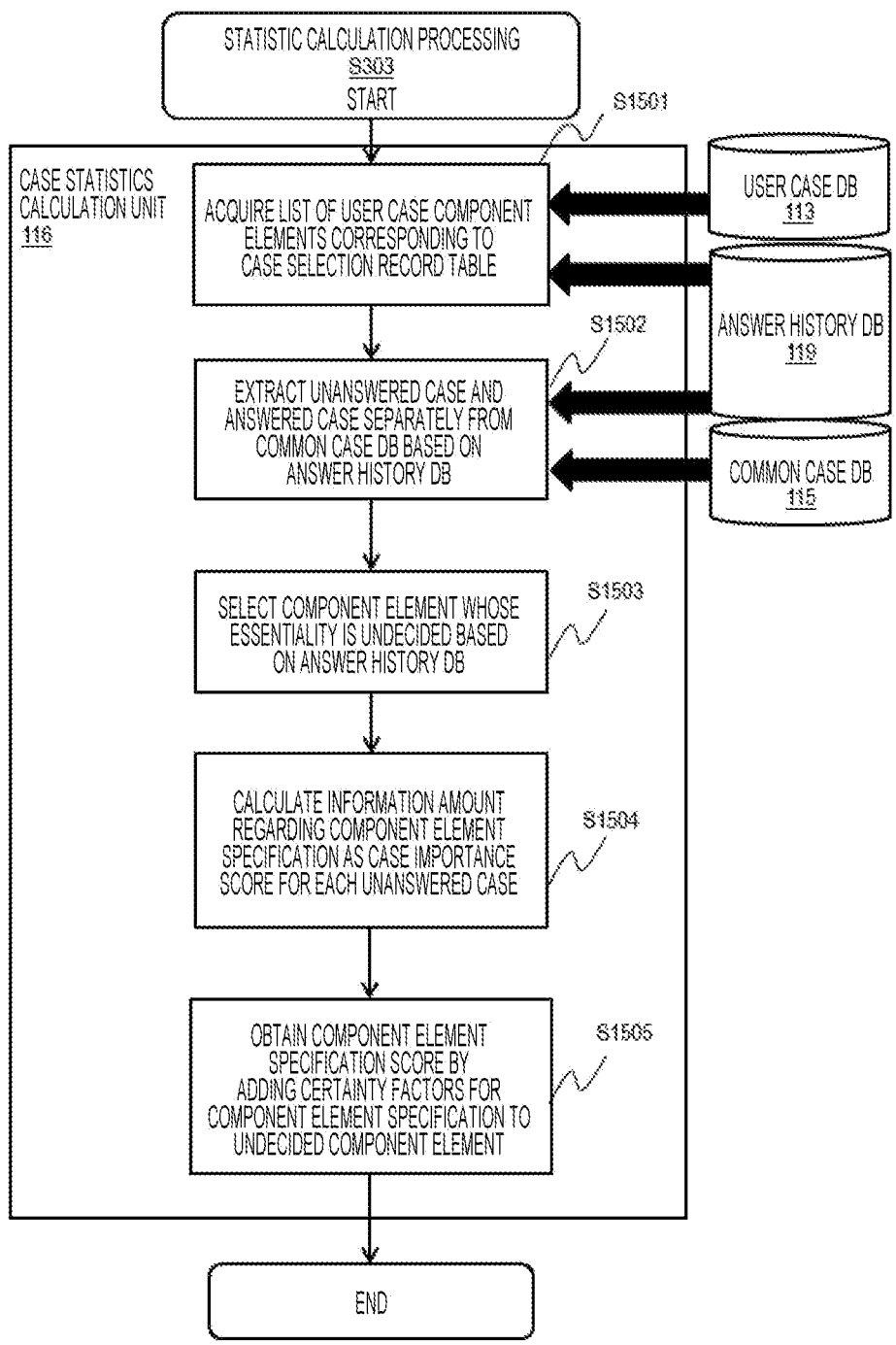
FIG. 15 illustrates an example of statistic calculation processing according to the first embodiment.

FIG. 15 illustrates details of the statistic calculation processing S303 of the first embodiment. First, the case statistics calculation unit 116 acquires a list of user case component elements corresponding to a record of the case selection record table 900 from the user case DB 118 (S1501). The case selection record table 900 stores information on the user case selected by the user 102 as a claim drafting target.

FIG. 16 is a diagram illustrating a configuration example of the user case component element table 1600 which stores the user case component elements. The user case component element table 1600 is stored in the user case DB 113. The items of the user case component element table 1600 include a user ID 1601, a case ID 1602, a component element ID 1603, and a presence/absence flag 1604. The user ID 1601 indicates each ID of the user, and the case ID 1602 indicates each ID of the user case. The combination of the value of the user ID 1601 and the value of the case ID 1602 is an identifier which can specify each record of the case selection record table 900.

The component element ID 1603 indicates an ID of each component element set in advance. The presence/absence flag 1604 indicates whether each component element indicated by the component element ID 1603 is included in this case.

As illustrated in FIG. 16, the user case DB 113 stores component element master data 1610. The items of the component element master data 1610 include a component element ID 1611 and a component element representation 1612. The component element ID 1611 indicates a plurality of preset component element IDs common to all user cases in the user case DB 113. The component element representation 1612 indicates a component element representation of each component element indicated by the component element ID 1611.

The value of the component element ID 1603 of the user case component element table 1600 matches the value indicated by the component element ID 1611 of the component element master data 1610, and the component element representation corresponding to these values can be obtained from the component element representation 1612.

Next, the case statistics calculation unit 116 acquires component elements from the common case DB 115 by separating a case (unanswered (unquestioned/) case) having no record in the answer history table (list of the applicability information 313) of the answer history DB 119 from a case (answered (questioned) case) recorded in the answer history table (S1502).

FIG. 17 is a diagram illustrating an example of the component element table 1700 of the common case DB 115. The items of the component element table 1700 include a case ID 1701, a component element ID 1702, and a presence/absence flag 1703. The case ID 1701 stores a value capable of identifying each record of the case table 1100, and matches a value of the case ID 1101 of the case table 1100.

The component element ID 1702 stores an ID of each of the predefined component elements. The presence/absence flag 1703 indicates whether each component element indicated by the component element ID 1702 is included in this case. The common case DB 115 further stores the same component element master data as the component element master data 1610 in the user case DB 113. The value of the component element ID 1702 matches the value of the component element ID of the component element master data, and the component element representation corresponding to these values can be obtained from the component element representation of the component element master data.

Figure 18:
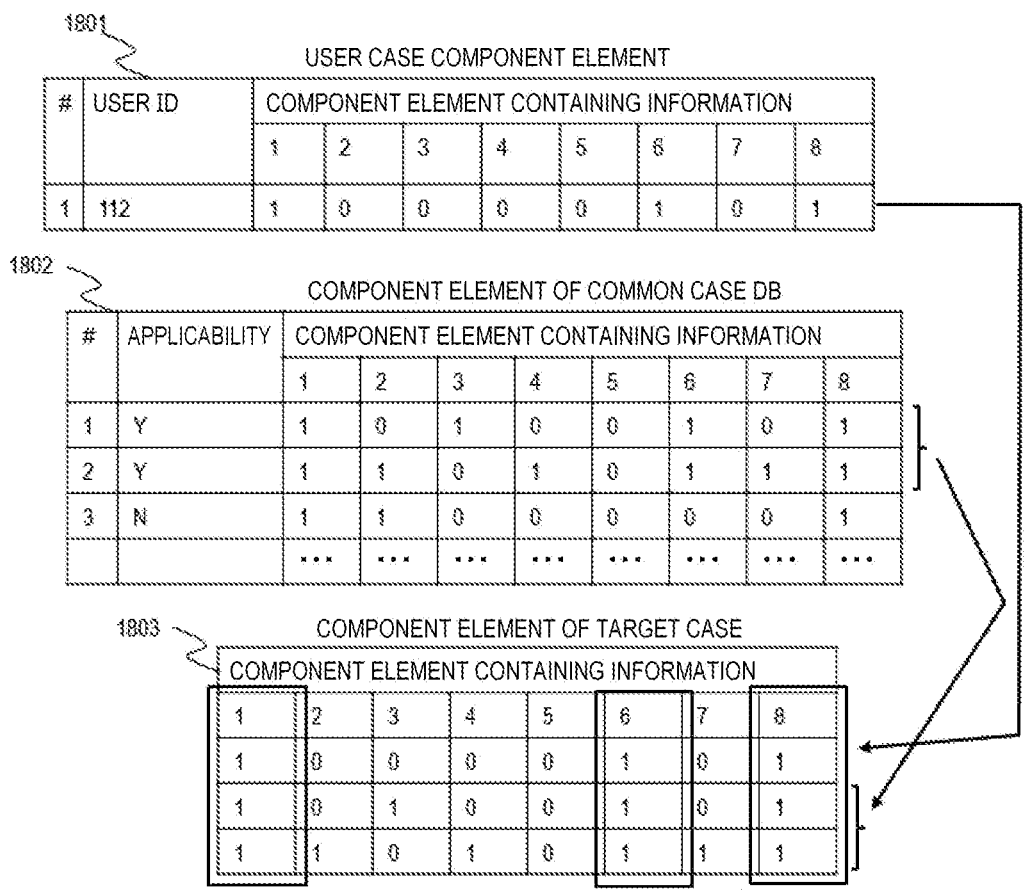
FIG. 18 is a schematic diagram of processing using a user component element according to the first embodiment.

Next, the case statistics calculation unit 116 selects a component element whose essentiality is undecided (S1503). This procedure will be described with reference to FIG. 18. FIG. 18 illustrates a table 1801 in which the results of the acquisition of the list of user case component elements (S1501) are arranged, and a table 1802 obtained as a result where the component element table 1701 of the common case DB 115 and applicability in the answer history table are arranged.

A record in the table 1801 indicates information on the component element of the selected user case. Each record in the table 1802 indicates information on a component element of each answered common case. The numbers 1 to 8 in the top row of the component element containing information are component element IDs, and the lower row indicates a flag indicating whether each component element is included. When the flag is 1, it means that the component is included in the case.

In the user case component element indicated by the table 1801, it can be inferred that the component element whose presence/absence flag is 0 is not an essential component element in this example. On the other hand, it can be said that the necessity is undecided in the sense that the component element with the flag 1 may be essential or not essential. In addition, in the table 1802, a record in which Y is stored in the applicability column is a target common case in the present example, and necessity is undecided for a component element having the presence/absence flag 1 in common in these records (it is undecided whether it is essential or not).

In order to collectively determine these cases, the user case and the applicable common case (the common case in which the applicability flag is YES) are extracted in one table 1803. Then, it cannot be determined whether or not a component element whose flag is 1 in all records is essential, and it can be determined that a component element whose presence/absence flag is 0 in any record is not essential. In this example, the essentiality of the component elements of the component element IDs 1, 6, and 8 cannot be determined.

Figure 19:
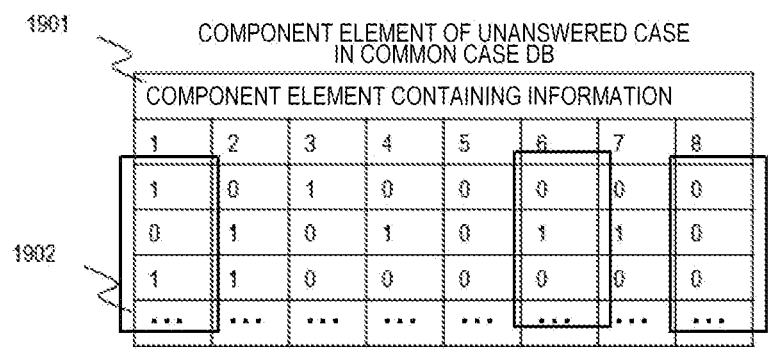
FIG. 19 illustrates an example an unanswered component element after extraction according to the first embodiment.

Next, the case statistics calculation unit 116 calculates a case importance score for each unanswered common case (S1504). FIG. 19 is a schematic diagram of a result 1901 of extracting only unanswered common cases. It can be determined how much information each unanswered case gives to a component element for which necessity is determined in the previous step S1503, based on whether or not the presence/absence flag of each undecided component element is 0.

For example, a record in the third row stores 1 with respect to the first component element 1902 in FIG. 19. Therefore, even if this common case is presented to the user 102, an answer of YES is obtained in response to a question as to whether it is the current target, it is still impossible to determine whether the first component element 1902 is essential.

Therefore, a case having a larger number of presence/absence flags of 0 for the component element for which the essentiality is not determined has the larger amount of information in a case where the answer of YES is obtained. However, for a case having a larger number of presence/absence flags of 0 for the component element, there is a high possibility that the answer will be NO. It can be said that the information obtained when the answer is NO is that it is not true that "the essential component elements are all 1" in that case. Therefore, a case having a large number of presence/absence flags of 0 for the component element hardly gives information.

Therefore, a case where the possibility of obtaining an answer of NO is statistically low and there are many component elements with the presence/absence flag of 0 should be selected. In other words, a case not similar (distant) to a case in which an answer of YES is obtained or a case in which an answer of NO is obtained should be selected.

For example, the case statistics calculation unit 116 can calculate the case importance score of each unanswered common case and determine the common case to be questioned next according to the value. As an example of the case importance score calculation method, the case importance score is calculated based on the distribution of undecided component elements of the non-applicable case in the answer history.

For example, a case in which the applicability flag 1202 of the applicability information 313 in the answer history table is NO is selected from the cases in the common case DB 115. The calculation method further selects, from among them, a case in which the number of component elements whose presence or absence is different from that of the current unanswered case is the smallest with respect to the component elements whose essentiality is undecided.

The calculation method calculates, as the case importance score, a sum of products of the number of component elements having different presence/absence indication between the selected case and the current unanswered case and the number of presence/absence flags of 0 in the current unanswered case. Instead of the number of presence/absence flags of 0 of the entire current unanswered cases, the number of presence/absence flags of 0 of the component elements for which the essentiality is undecided may be used.

As other calculation methods, the case importance score is calculated based on the distribution of the component elements of the applicable case and the non-applicable case included in the answer history. For example, one of the methods collects the answered cases stored in the answer history table of the common case DB 115 regardless of whether the applicability flag is YES or NO, and calculates the ratio of the presence/absence flag of 0 and the ratio of the presence/absence flag of 1 for each component element. Furthermore, in the calculation method, for each unanswered case, a ratio of 0 is selected when the presence/absence flag of the component element is 1, and a ratio of 1 is selected when the presence/absence flag of the component element is 0, and these are integrated (summed) to obtain the case importance score. As a result, it is possible to select an unanswered case to be questioned next in consideration of the characteristics of the answered cases in which the applicability is YES.

In the second calculation method, the weight to be used in the product-sum can be determined further based on the distribution (statistics) of the component elements of the unanswered (unprocessed) case. Specifically, similarly in the case of the unanswered case, the ratio of the presence/absence flag of 0 and the ratio of the presence/absence flag of 1 are calculated for each component element. A value such that the value increases as the ratio approaches 50% is set as a weight for each component element. For example, a value based on an information entropy (ratio of log 0+ratio of log 1) can be used. As a result, it is also possible to reflect the importance related to the statistics of the unanswered cases in the common case DB 115, such as the information amount of the component element in which "the applicability flag is 1 in all the unanswered cases in the common case DB 115" is low.

Another calculation method may calculate the sum of products of the information entropy of component elements of the unanswered case as the case importance score of each unanswered case.

Next, the case statistics calculation unit 116 calculates and adds the certainty factor of the undecided component elements to obtain the component element specification score (S1505). This calculation is, as described above, a calculation relating to the fact that it cannot be said that at least a component element whose presence/absence flag is 1 in all cases where the applicability flag in the answer history table indicates YES is unnecessary. That is, the amount indicating the degree to which such a component element is estimated to be essential is calculated, and this is used as the certainty factor.

The certainty factor of the undecided component element can be determined based on the distribution of the undecided component element in the answer history DB 119. For example, the certainty factor can be calculated based on statistics of component elements of a non-applicable case. As an example, the case statistics calculation unit 116 can determine whether this component element is essential based on the number of cases where the component element flag is 0 in cases where the applicability flag is NO (out of the target scope). The larger the number of the component element flags is 0, the higher the possibility that the component element is essential.

Alternatively, the case statistics calculation unit 116 can calculate the ratio of the presence/absence flag of 1 in the entire cases of the common case DB 115 for each undecided component element, evaluate the significance of the statistical bias of the case where the applicability flag of the answer history table is YES, and use the index as the certainty factor of the essentiality of each component element. For example, in a case where the same number of samples as the cases where the applicability flag is YES are randomly acquired from the common case DB 115, the probability that the presence/absence flags of the component elements are all 1 can be used as the certainty factor of the essentiality of the component elements.

The case statistics calculation unit 116 can evaluate the validity of the determination that all of the current "component elements for which the essentiality is undecided" are necessary by taking the sum of these certainty factors and adding them, and thus, the case statistics calculation unit 116 uses this as the component element specification score.

Each component element considered to be essential estimated by this procedure is associated with the component element representation by referring to the component element master data in the common case DB 115. This can be used to generate an example 1301 in the descriptive question screen 314 of FIG. 13 or a display 1401 of a draft document in the draft document display 315 of FIG. 14.

According to the above embodiment, the user can specify the essential component elements for a case including a plurality of component elements only by answering the yes or no selective question. As a specific example, a list of partial structures, which is a draft (draft document) of the claims related to a chemical formula, can be created. As a result, a practician of business can write a draft document to be considered regarding patentability without wasting time, and it is possible to suppress the loss of empirical knowledge.

In addition, if the description of the claims becomes appropriate, it leads to a reduction in the number of unnecessary responses to rejection in patent examination, and the intellectual property can be efficiently utilized. Note that the features of the present specification can be applied to creation of draft claim in a mode different from the chemical formula. In addition, the draft claim is an example of a draft document, and the features of the present embodiment can be applied to creation of other types of draft documents.

Second Embodiment

Figure 20:
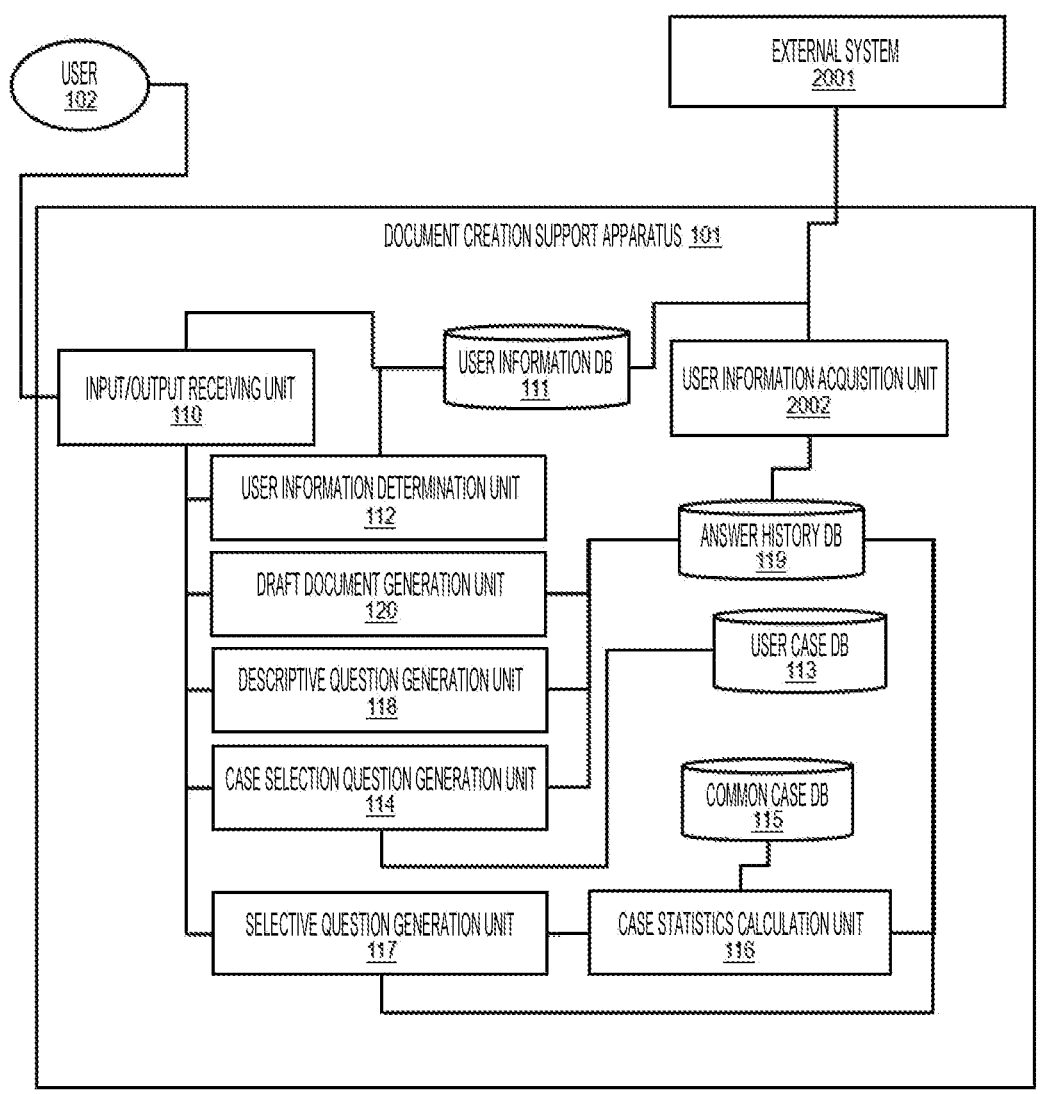
FIG. 20 illustrates a configuration example according to the second embodiment.

FIG. 20 illustrates an example of a configuration of a system of the second embodiment. The second embodiment supports selection of an element to be written when the user 102 writes a report related to a matter such as a meeting attended. One of the differences between the second embodiment and the first embodiment is that information of the user 102 is acquired from an external system 2001 or the like and used. Therefore, a user information acquisition unit 2002 is included in the document creation support apparatus 101.

As the external system 2001, another system for managing user information can be used. For example, a system for managing master data of employee information or work information, or another document writing support system may be used. In addition, information of a plurality of external systems may be used at the same time.

Figure 21:
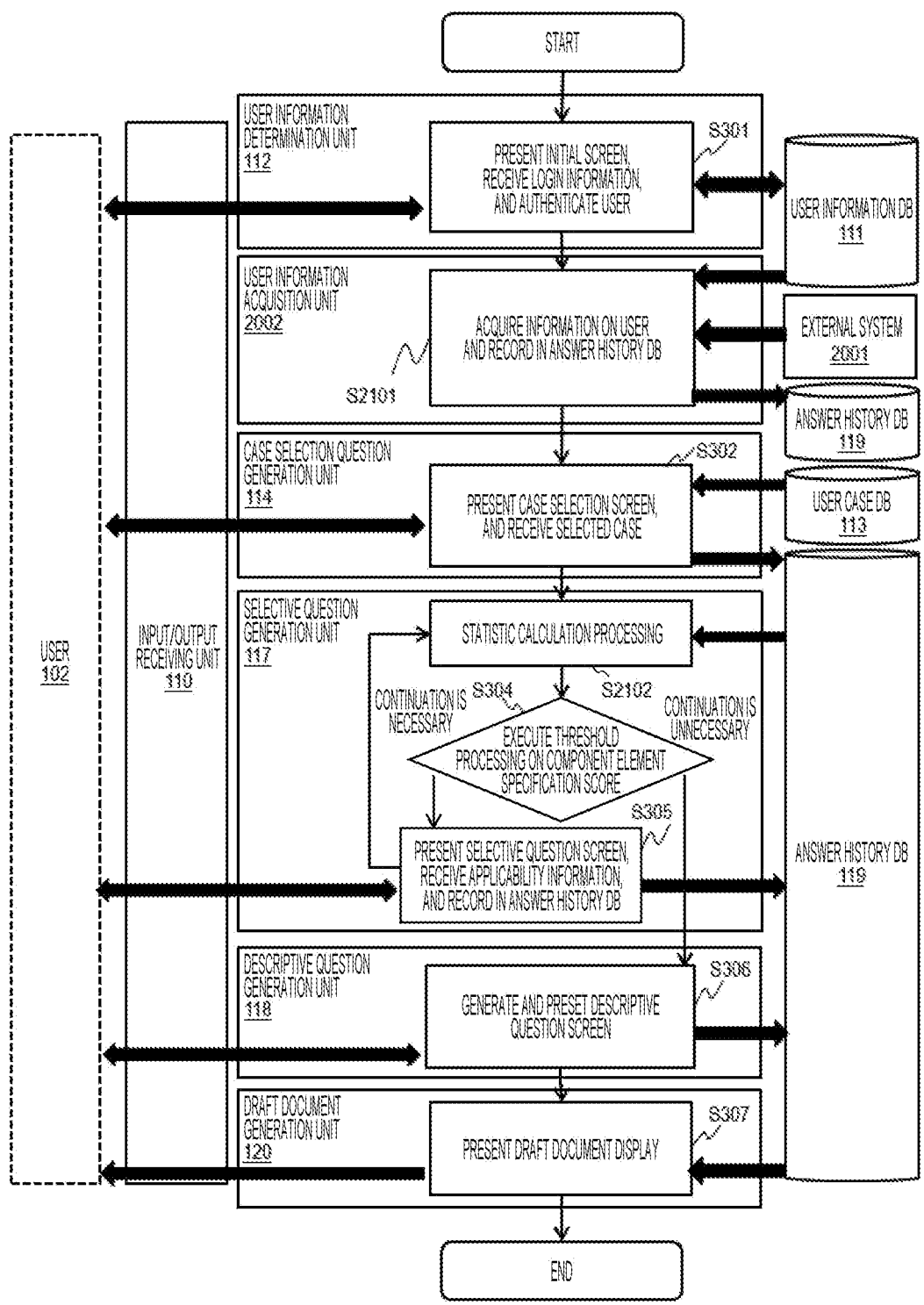
FIG. 21 illustrates an example of a processing flow according to the second embodiment.

FIG. 21 illustrates an operation flow of the second embodiment. One of the differences from the first embodiment is that the user information acquisition unit 2002 acquires information in the user information DB 111 or information on the user from the external system 2001, and stores the information as one of answers obtained in advance in the answer history DB 119 (S2101). The statistic calculation processing S2102 is also included in the main difference from the first embodiment.

FIG. 22 is a diagram illustrating a configuration example of a user data table 2201 which is information acquired from the user information DB 111 by the user information acquisition unit 2002. The user data table 2201 stores an attribute 2202 of the user is stored in association with the user, which is the difference from the first embodiment. This user attribute is information that affects the type of document written by the user, such as the user's work in charge and work history, and the number of necessary questions can be reduced by using this as an answer to one question. The user attribute is included in an essential component element in step S2701 described later.

FIG. 23 is a diagram illustrating a configuration example of an external information management table 2301 of the answer history DB 119 to which the information acquired by the user information acquisition unit 2002 is written. The external information management table 2301 includes an external information type 2304 and an external information content 2305 corresponding to a user ID 2302 and a project ID 2303 which are capable of specifying a user and a project.

The external information type 2304 stores a code value indicating the source of the external information. For example, for the data acquired from the user data table 2201, a code value indicating that is used. An identifier for specifying the external system 2001 is used for the information of the external system 2001.

Figure 24:
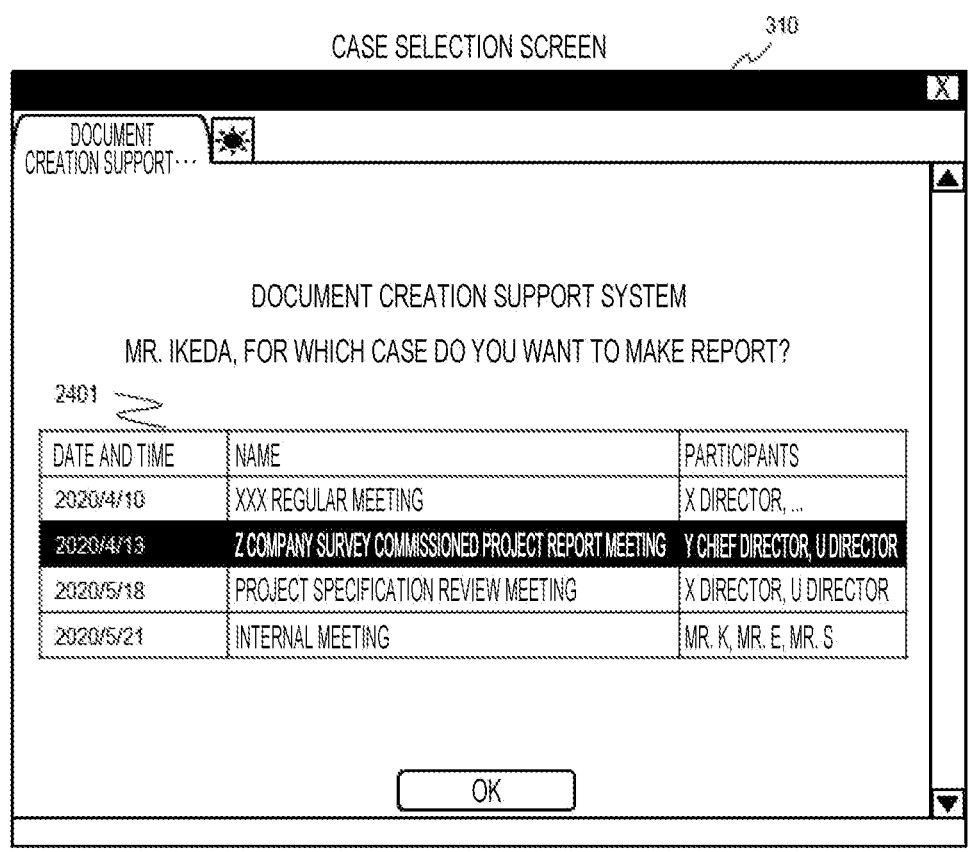
FIG. 24 illustrates an example of a case selection screen according to the second embodiment.

FIG. 24 illustrates an example of a case selection screen 310 of a user case in the second embodiment. Unlike the first embodiment, each case indicates information related to a meeting rather than a chemical formula. In the example of FIG. 24, a case selection screen 310 shows a list 2401 of a plurality of meetings. Each record indicates information of one meeting, specifically, a date and time, a name, and participants. The case selection screen 310 can be generated in the same manner as in the first embodiment. That is, the case representation 803 stored in the user case table 800 of FIG. 8 may store information regarding the meetings. The user selects one meeting from the list 2401.

In the first embodiment, the case included in the common case DB 115 is presented to inquire the user about the applicability of the content the user is considering. In contrast, in the second embodiment, a component element, not a case, is directly used as the selective question. The document creation support apparatus 101 inquires whether the presented component element is applicable to the content of the draft that the user is currently considering.

Figure 25:
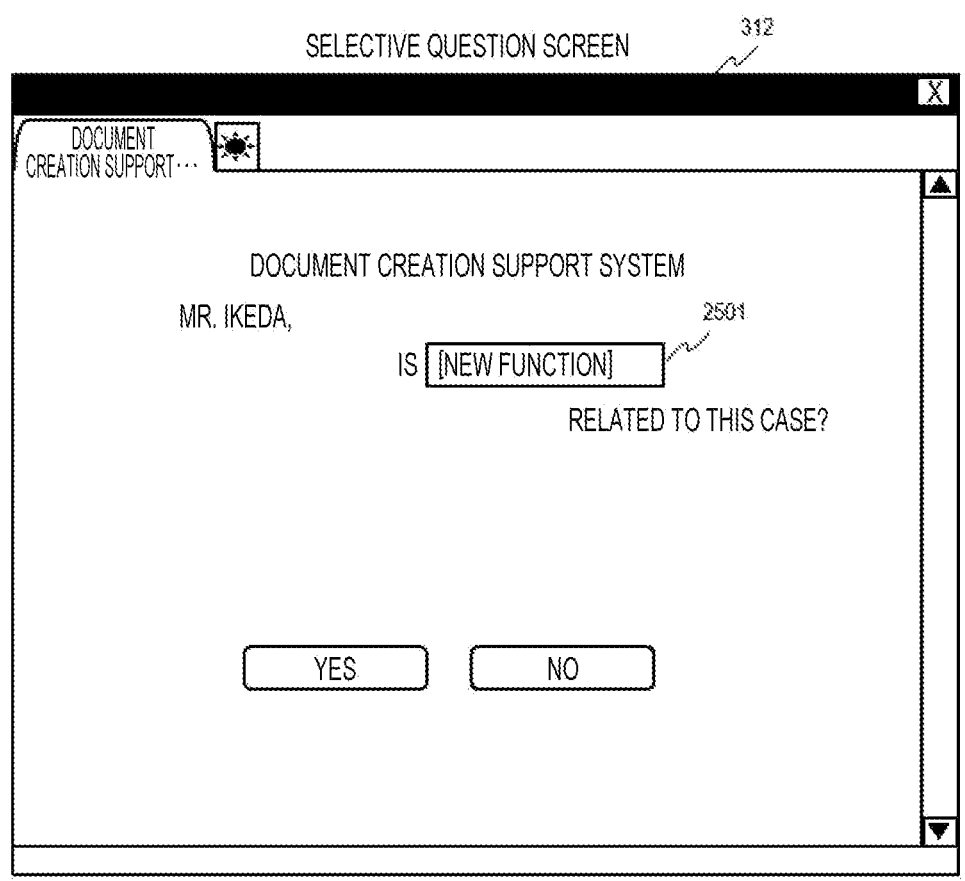
FIG. 25 illustrates an example of a selective question screen according to the second embodiment.

FIG. 25 illustrates an example of a selective question screen 312 according to the second embodiment. A component element of the case is, for example, a keyword of the report document. In the example of FIG. 25, a keyword 2501 is presented to the user, and a question is made as to whether the keyword is related to the user's idea.

The component element table 1700 of FIG. 17 can be configured using data in which component elements of a past report example are identified based on a result of examining a past report example according to a dictionary created in advance and examining whether or not each keyword appears. In the second embodiment, the user case component element table 1600 of FIG. 16 is constructed such that a presence/absence flag 1604 is always 0. Furthermore, the component element representation 1612 of the component element master data 1610 stores a representation as a keyword and a representation used at the time of creating a draft document. This can be changed according to the type of draft document to be created.

For example, in a case where the document to be created is not a document made only of text but a presentation slide including a drawing, the component element representation 1612 stores what figure or character is inserted at which position of a slide of what design. In this manner, the content of the component element representation 1612 can be applicable to an arbitrary form.

Figure 26:
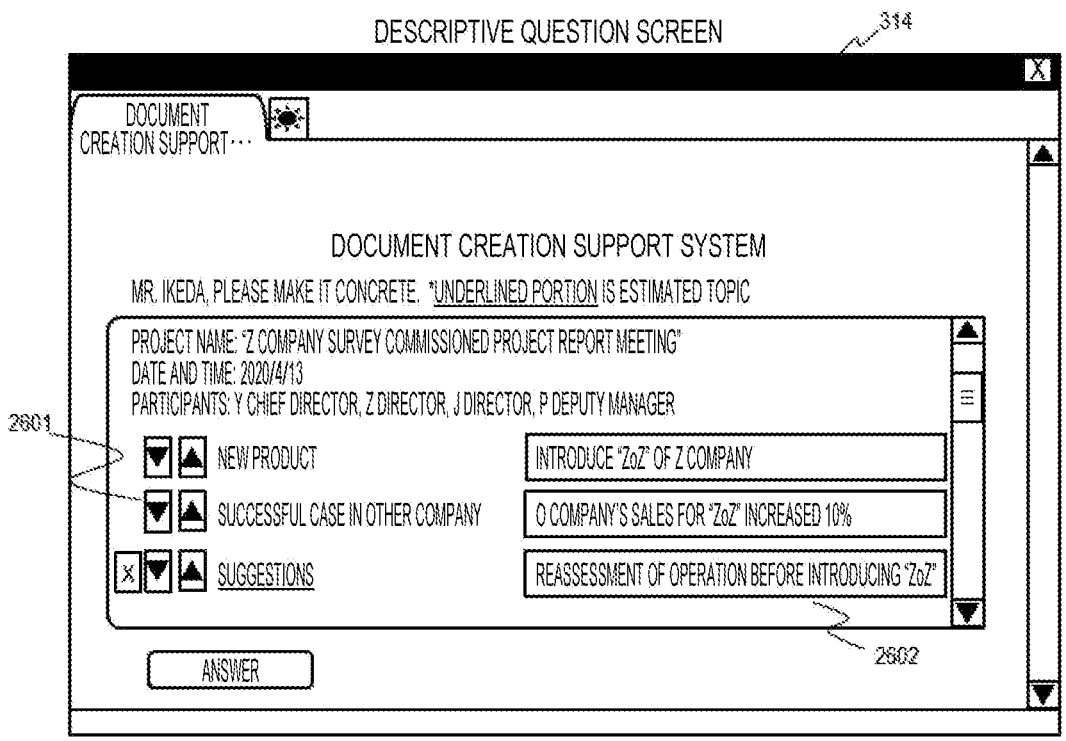
FIG. 26 illustrates an example of a descriptive question screen according to the second embodiment.

FIG. 26 illustrates an example of a descriptive question screen 314 of the second embodiment. In the second embodiment, the draft document to be created (draft document) takes the form of a report. Therefore, the descriptive question generation unit 118 requests further realization with the descriptive question for each keyword (component element) specified by the selective question. In the example of FIG. 26, each component element 2601 and a text box 2602 in which the user 102 describes details thereof are listed. The user can change the order of the descriptions using the control on the left.

In addition, the descriptive question generation unit 118 selects a component element having a sufficiently high certainty factor of the essentiality of the component element calculated in the statistic calculation processing S2102 exceeding a predetermined threshold, the component element for which an explicit answer has not been obtained from the user. The descriptive question generation unit 118 sets the selected component element to be included in the descriptive question screen 314. The upper limit of the number of selected component elements may be set in advance. In the example of FIG. 26, this component element is displayed in a form distinguishable from the component element selected by the user together with an underline. When the estimation is wrong and the component element is unnecessary, the user 102 can delete the component element by pressing the "x" button. It is possible to create a more appropriate document by indicating, to the user 102, an unselected component element having a high certainty level of the essentiality.

Figure 27:
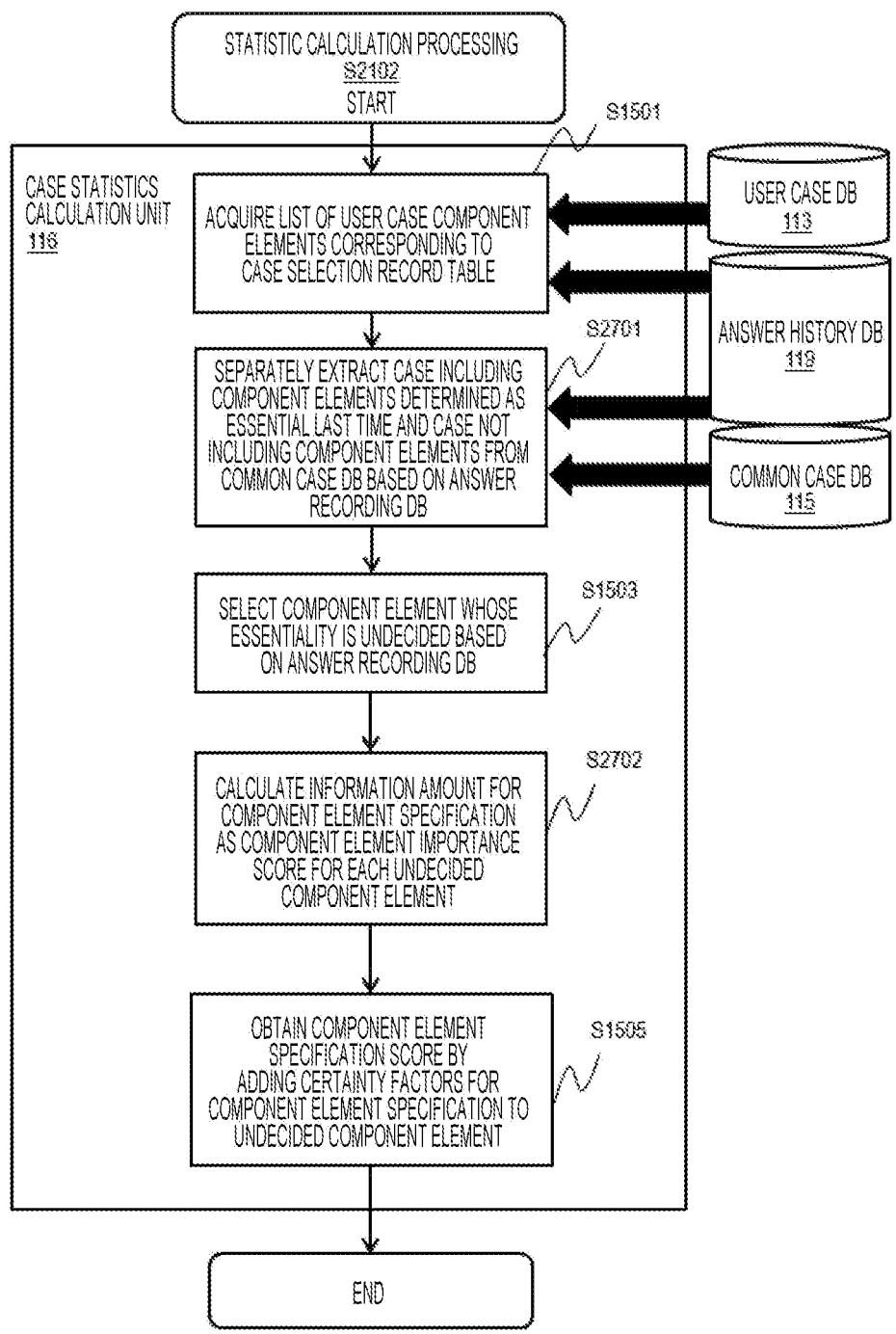
FIG. 27 illustrates an example of statistic calculation processing according to the second embodiment.

In performing the display as described above, the statistic calculation processing S2102 different from that of the first embodiment is executed. FIG. 27 illustrates a flowchart of an example of the statistic calculation processing S2102 in the second embodiment. One of the differences between the statistic calculation processing S2102 of the second embodiment from the statistic calculation processing of the first embodiment is as described below. In the first embodiment, the case importance score is calculated for each case for question selection. On the other hand, in the second embodiment, the component element importance score that is a score for each component element is calculated (52702).

In the flowchart of FIG. 27, step S1501 is similar to the statistical calculation processing of the first embodiment illustrated in FIG. 15. The list of user case component elements generated in step S1501 indicates presence/absence flags of 0 for all the component elements. Step S1501 may be omitted.

Next, based on the information in the answer history DB 119, the case statistics calculation unit 116 separately extracts a case (target case) including a component element determined to be essential at the previous time and a case (non-target case) not including the component element from the common case DB 115 (S2701). In the first loop, all cases are selected. Next, in the target case, the case statistics calculation unit 116 selects a component element of which the essentiality is undecided, that is, a component element of which the answer is not made (S1503).

Next, the case statistics calculation unit 116 calculates the component element importance score of the selected unanswered component element. This component element importance score can be calculated based on the distribution of unquestioned component elements. For example, an information entropy obtained from the ratio of 0 and 1 of each component element in the target case, for example, "ratio of log 0+ratio of log 1" can be used. This makes it possible to determine a component element for which it is effective to ask a question.

In step S305 in FIG. 21, the case statistics calculation unit 116 sequentially inquires the user 102 whether a component element is a target of the draft document from the unanswered component having the highest component element importance score. The component element selected as the target of the draft document is the component element determined to be essential at the previous time in step S2701.

In step S1505 in FIG. 27, the case statistics calculation unit 116 calculates the certainty factor of an undecided component element and calculates a component element identification score from these values. The undecided component element is a component element which is unanswered, that is, unquestioned in the common case DB 115. The certainty factor of the undecided component element can be calculated based on statistics of the undecided component element in the common case.

For example, the case statistics calculation unit 116 selects all cases including any of the component elements determined to be essential. As described in the first embodiment, the certainty factor of each unanswered component element can be determined by comparing the probability of becoming 1 of the unanswered component element in these cases with the probability of becoming 1 of the unanswered component element in the common case DB 115.

In another example, the case statistics calculation unit 116 forms a group of cases including each component element determined to be essential. Each case of the group includes at least one essential component element corresponding to the group. The case statistics calculation unit 116 compares the maximum value of the probability of becoming 1 of the unanswered component element in each group with the probability of becoming 1 of the unanswered component element in the common case DB 115. The case statistics calculation unit 116 can determine the certainty factor of each unanswered component element based on the comparison result.

For example, when the sum of the certainty factors of the unanswered component elements is smaller than the threshold value, it is determined that the continuation of the question is not necessary. If any unanswered component element whose certainty factor exceeds the threshold remains, it is presented to the user 102 as a recommended component element.

Figure 28:
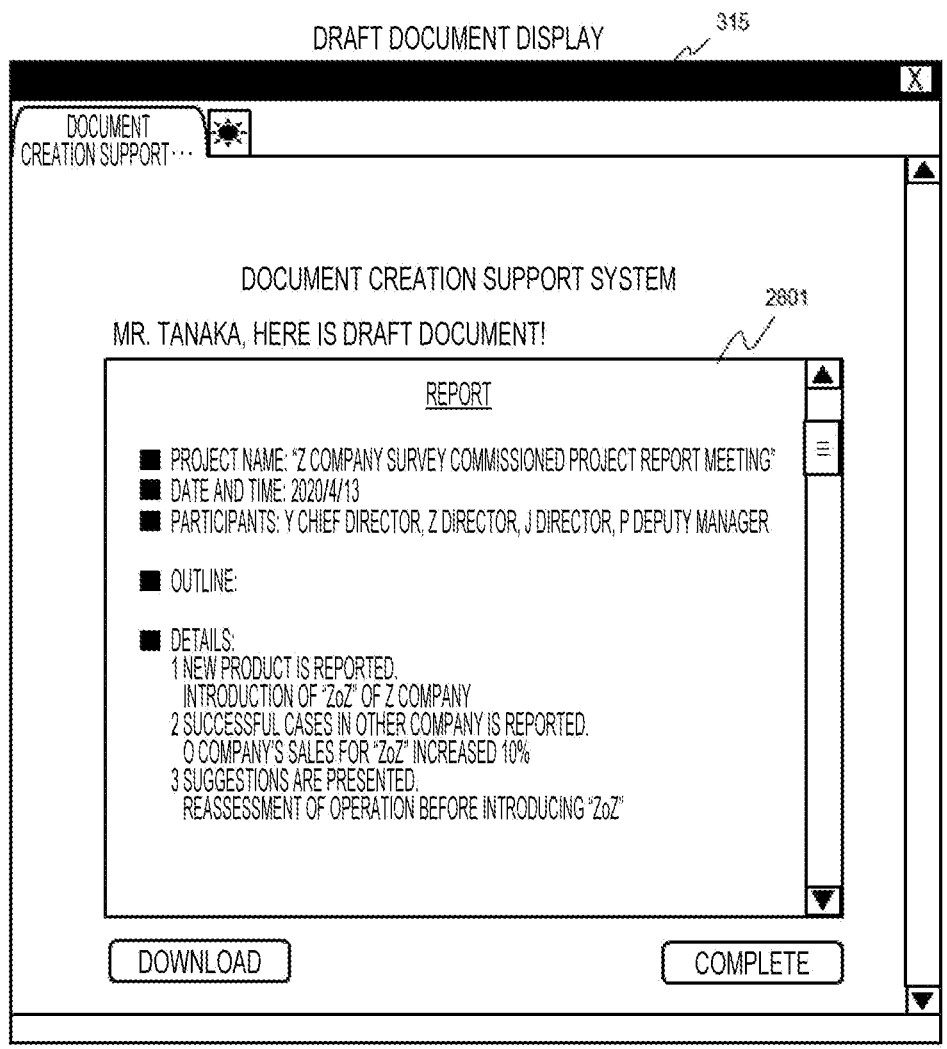
FIG. 28 illustrates an example of draft document display according to the second embodiment.

By applying the second embodiment, a draft document of a report such as the draft document example illustrated in FIG. 28 can be obtained. Although this draft document has blanks and insufficient descriptions, the user can acquire the document file as an editable document file by known software by pressing a download button, and can finish the report by editing the document file. Compared with writing the document from scratch, it is relatively easy to fill the blank with the document, so that the document can be completed in a shorter time.

The features of the embodiments of the present specification can be applied to creation support of documents of a type different from the claims of the patent application documents and the reports of the meeting, for example, reports on booth groups visited in the exhibition, investigation reports for selecting order suppliers of system development, and the like.

Note that the present invention is not limited to the above-described embodiments, and includes various modifications. For example, the above-described embodiments have been described in detail in order to simply describe the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is also possible to add, delete, and replace other configurations for a part of the configuration of each embodiment.

In addition, a part or all of the above-described configurations, functions, processing means, and the like may be realized by hardware, for example, by designing with an integrated circuit. In addition, each of the above-described configurations, functions, and the like may be realized by software by a processor interpreting and executing a program for realizing each function. Information such as a program, a table, a file, and the like for realizing each function can be stored in a storage device such as a memory, a hard disk, and a solid state drive (SSD), or a recording medium such as an IC card, an SD card, and the like.

In addition, the control lines and the information lines indicate those necessary for the description, and do not necessarily indicate all the control lines and the information lines on the product. In practice, it may be considered that almost all the configurations are connected to each other.

The invention claimed is:

1. An apparatus for generating a draft document for a user, the apparatus comprising:
   one or more processors; and
   one or more storage devices,
   wherein the one or more storage devices store a case database which stores a plurality of cases each including one or more component elements,
   wherein the one or more processors repeat question processing for one or more component elements selected from the case database to the user,
   wherein the question processing includes:
   presenting, by an output device, the one or more component elements selected from the case database to the user;
   presenting, by the output device, a question as to whether the one or more component elements are applicable to a content of a draft document to the user;
   acquiring, via an input device, an answer of the user to the question; and
   adding the answer in an answer history stored in the one or more storage devices,
   wherein the one or more processors select one or more component elements for which the question processing is to be executed next from among one or more component elements for which question processing is unprocessed in the plurality of cases based on statistics of at least a part of the component elements in the plurality of cases, and generate the draft document based on a component element indicating that the answer history is applicable to a content of the draft document of the user,
   wherein the one or more component elements for which the question processing is executed are component elements constituting one case of the plurality of cases,
   wherein the answer history indicates an applicable case to a content of the draft document and a non-applicable case to a content of the draft document,
   wherein the answer history indicates an undecided component element which is a component element included in all the applicable cases, and
   wherein the one or more processors determine whether or not to stop the question processing based on a distribution of the undecided component elements in the answer history.

2. The apparatus according to claim 1,
   wherein the case database stores information of a component element of each of the plurality of cases,
   wherein the information of the component element in the case indicates whether each predefined component element is included in the case,
   wherein the answer history indicates an applicable case to content of the draft document and a non-applicable case to content of the draft document, and
   wherein the one or more processors select a case for which the question processing is to be executed next based on a distribution of component elements of the applicable case and the non-applicable case.

3. The apparatus according to claim 1,
   wherein the case database stores information of a component element of each of the plurality of cases,
   wherein the information of the component element in the case indicates whether each predefined component element is included in the case,
   wherein the answer history indicates an applicable case to a content of the draft document and a non-applicable case to a content of the draft document,
   wherein the answer history indicates an undecided component element which is a component element included in all the applicable cases, and
   wherein the one or more processors select a case for which the question processing is to be executed next based on a distribution of undecided component elements of the non-applicable case.

4. The apparatus according to claim 1,
   wherein the apparatus selects a case for which the question processing is to be executed next based on a distribution of component elements in an unprocessed case which is a case where the question processing is unprocessed in the plurality of cases.

5. The apparatus according to claim 1,
   wherein the one or more processors select one or more component elements for which the question processing is to be executed next from the one or more component elements for which the question processing is unprocessed in the plurality of cases, based on statistics of component elements in the answer history.

6. The apparatus according to claim 1,
   wherein the one or more processors repeat question processing to a component element selected from the case database to the user, and select a case for which the question processing is to be executed next based on a distribution of component elements for which the question processing is unprocessed in the plurality of cases.

7. The apparatus according to claim 1,
wherein the one or more storage devices include information regarding the user, and
wherein the answer history includes information regarding the user as an answer for a component element.

8. The apparatus according to claim 1,
wherein the one or more processors estimate a component element applicable to the draft document from among component elements for which the question processing is unprocessed based on statistics of the unprocessed component elements in the plurality of cases.

9. The apparatus according to claim 1,
wherein each of the plurality of cases represents a chemical formula, and
wherein each component element in each of the plurality of cases is a substructure of a chemical formula.

10. A method for generating, by an apparatus, a draft document for a user, the apparatus storing a case database storing a plurality of cases each including one or more component elements, the method comprising:
repeating, by the apparatus, question processing for one or more component elements selected from the case database to the user, the question processing including
presenting, by an output device, the one or more component elements selected from the case database to the user,
presenting, by the output device, a question as to whether the one or more component elements applicable to a content of a draft document to the user,
acquiring, via an input device, an answer of the user to the question; and
adding the answer in an answer history stored in the one or more storage devices, the one or more processors selecting one or more component elements for which the question processing is to be executed next from among one or more unprocessed component elements in the plurality of cases based on statistics of at least a part of the component elements in the plurality of cases, and generating the draft document based on a component element indicating that the answer history is applicable to a content of the draft document of the user,
wherein the one or more component elements for which the question processing is executed are component elements constituting one case of the plurality of cases,
wherein the answer history indicates an applicable case to a content of the draft document and a non-applicable case to a content of the draft document,
wherein the answer history indicates an undecided component element which is a component element included in all the applicable cases, and
wherein the one or more processors determine whether or not to stop the question processing based on a distribution of the undecided component elements in the answer history.

11. An apparatus for generating a draft document for a user, the apparatus comprising:
one or more processors; and
one or more storage devices,
wherein the one or more storage devices store a case database which stores a plurality of cases each including one or more component elements,
wherein the one or more processors repeat question processing for one or more component elements selected from the case database to the user,
wherein the question processing includes:
presenting, by an output device, the one or more component elements selected from the case database to the user;
presenting, by the output device, a question as to whether the one or more component elements are applicable to a content of a draft document to the user;
acquiring, via an input device, an answer of the user to the question; and
adding the answer in an answer history stored in the one or more storage devices,
wherein the one or more processors select one or more component elements for which the question processing is to be executed next from among one or more component elements for which the question processing is unprocessed in the plurality of cases based on statistics of at least a part of the component elements in the plurality of cases, and generate the draft document based on a component element indicating that the answer history is applicable to a content of the draft document of the user,
wherein the one or more component elements for which the question processing is executed are component elements constituting one case of the plurality of cases,
wherein each of the plurality of cases represents a chemical formula, and
wherein each component element in each of the plurality of cases is a substructure of a chemical formula.

* * * * *